United States Patent Office 2,837,559
Patented June 3, 1958

2,837,559

NITRILE TELOMERS

Joseph E. Fields, Dayton, Ohio, assignor to Monsanto Chemical Company, St. Louis, Mo., a corporation of Delaware No Drawing. Application September 27, 1954
Serial No. 458,689

15 Claims. (Cl. 260—465.7)

The present invention relates to new nitrogen- and halogen-containing products and a process for producing them. More particularly, the invention pertains to nitrile telomers produced by the free-radical-catalyzed reaction of nitriles with halogenated hydrocarbons.

Numerous processes have been described for the polymerization and copolymerization of acrylonitrile and methacrylonitrile. The products of these processes have found application in many and varied fields. Such products have generally, however, been polymers of high average molecular weight and, despite their wide acceptance in the plastics industry, have consequently failed in some applications because of certain difficulties in their manufacture and fabrication. The high temperatures required, for example, in molding polyacrylonitrile often results in degradation of the polymer leading to a finished material of inferior qualities. Since, in general, the solubility of the polymers in any given solvent decreases with an increase in molecular weight, it is often difficult to supply solutions of the materials where specific applications demand the material in this form. These difficulties may frequently be overcome by employing material of low average molecular weight. In many cases, too, low average molecular weight material has unique physical characteristics which make it preferable in some instances to the higher molecular weight material.

Low average molecular weight products may be prepared from unsaturated monomers having olefinic unsaturation by a process termed "telomerization." Telomerization is defined in U. S. Patent 2,440,800 issued to Hanford and Joyce as follows: "the process of reacting, under polymerization conditions, a molecule YZ which is called a 'telogen' with more than one unit of a polymerizable compound having ethylenic unsaturation called a 'taxogen' to form products called 'telomers' having the formula $Y(A)_nZ$ where $(A)_n$ is a divalent radical formed by chemical union, with the formation of new carbon bonds, $n$ being any integer greater than one, and Y and Z being fragments of the telogen attached to the terminal taxogens." Much work has been done in the prior art on telomerization of olefinic materials such as ethylene, propylene, octene-1, styrene, allyl chloride, and the like, but little attention has been given to the telomerization of unsaturated aliphatic nitriles such as acrylonitrile and methacrylonitrile.

Accordingly, it is an object of the present invention to provide new compositions of matter of the following general structure

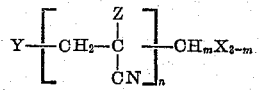

wherein Y may be hydrogen or a halogen, Z is hydrogen or a $CH_3$ group, X is a halogen, $n$ is an integer from 2 to 30, and $m$ may vary from 0 to 2.

It is a further object of the invention to provide a process for the preparation of such nitrile telomers.

Other objects and advantages of the invention will become apparent from the description which follows.

According to the invention, an aliphatic unsaturated nitrile is reacted with a halomethane in the presence of a free-radical-type catalyst to yield a telomer whose physical properties may be "tailored" so to speak by controlling the ratio of reactants, the temperature of the reaction, and the particular catalyst employed. The reaction products conforming to the general formula

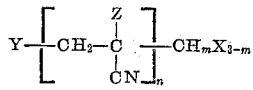

wherein

Y=hydrogen or halogen
X=a halogen
P=hydrogen or $CH_3$
$n$=an integer from 2 to 30, and
$m$=0 to 2 are not simple addition products or interpolymers. The latter result from a number of molecules of each reactant entering into the polymer chain and the product is a high molecular weight polymeric material. In the reaction of the invention, on the other hand, only one molecule of the halomethane compound enters into the formation of each molecular species and the average molecular weight of the product is, in general, considerably lower than that of an interpolymer formed under comparable conditions.

The telomers of the invention are useful as molding powders, plasticizers, drilling mud deflocculants, and chemical intermediates, e. g., by partial hydrolysis they may be converted to polybasic acids.

The following specific examples are given in order that the process may be more fully understood, but the invention is not to be considered as limited thereto in any manner. All parts are by weight.

Example I

Methacrylonitrile (486 g.) and carbon tetrachloride (2217.6 g.) were mixed together and 24.3 g. of benzoyl peroxide was dissolved therein. The mixture was poured into "Coke" bottles which were sealed and tumbled in an air oven at 43 R. P. M. for 72 hours at 100° C. At the end of the reaction period, the contents of the bottles were combined and filtered. The precipitated solid polymeric material was washed with carbon tetrachloride and dried thoroughly.

Approximately 360 g. of a polymeric product having a chlorine content of 18.55% was obtained. This analysis corresponds to a molecular weight of 756 or an average composition of 9.1 monomer units to one of carbon tetrachloride and characterizes the reaction product as a telomer which may be represented by the following formula:

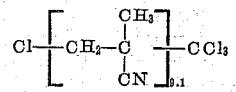

In a duplicate run, 340 g. of the same telomer were produced.

Example II

A mixture of 20 parts of methacrylonitrile, 138.6 parts of carbon tetrachloride, and 1 part of benzoyl peroxide was placed in a clean "Coke" bottle. After sealing, the bottle was tumbled in an air oven at 43 R. P. M. for 25 hours at a temperature of 95° C. The solid polymeric product recovered by filtration of the reaction mixture had a chlorine content of 9.92% corresponding to a molecular weight of 1430. This represents a telomer having a degree of polymerization of 19, i. e., an average composition of 19 monomer units to one of carbon tetrachloride.

Example III

A stainless-steel autoclave was charged with 27.8 parts of acrylonitrile 322.2 parts of carbon tetrachloride, and 1.7682 parts of benzoyl peroxide. The autoclave was sealed, heated to 100° C. and rocked at that temperature for approximately 5 hours. At the end of that time the autoclave was opened and its contents were poured through a filter. The precipitated polymer was dried at a temperature of 80° C. to remove all traces of the carbon tetrachloride. The polymeric product, a free-flowing white powder of low bulk density, was then dried in an oven at 70° C. and 100 mm. of Hg to constant weight.

There was obtained 18.5 parts of a material having a molecular weight of 940, i. e., a degree of polymerization of 14.8, and a specific viscosity of 0.1360, determined at 30° C. on a solution of 0.2 g. of the telomer in 50 ml. of dimethylformamide.

Example IV

A mixture of 265 parts of acrylonitrile, 1538 parts of carbon tetrachloride, and 4.409 parts of benzoyl peroxide was heated for five hours in a stainless steel rocking autoclave at a temperature of 100° C. The reaction mixture was filtered through a Buchner funnel and the polymeric precipitate was then dried for 36 hours at a temperature of 80° C. to remove all traces of unreacted carbon tetrachloride. Approximately 238.5 parts of a buff colored free-flowing powder representing a yield of about 90% was obtained. The specific viscosity of the polymeric product was determined as in Example III to be 0.3427 and the material had a molecular weight of 1730, representing a degree of polymerization of 29.7 or a formula corresponding to the structure $$Cl-\left[\begin{array}{c}CH_2-CH\\ |\\ CN\end{array}\right]_{29.7}-CCl_3$$

Example V

The experiment of Example IV was repeated using 106.9 parts of acrylonitrile, 3082 parts of carbon tetrachloride and 6.782 parts of benzoyl peroxide. The temperature in this case was elevated to 120° C. About 81 parts of a solid telomer with a specific viscosity of 0.0888 and a molecular weight of 780, equivalent to a degree of polymerization of 11.8, was obtained.

Example VI

In the manner of Example III, a mixture of 19.0 parts of acrylonitrile, 331 parts of carbon tetrachloride and 1.2117 parts of benzoyl peroxide was heated to a temperature of 100° C. for 5 hours and 17.0 parts of solid telomer was obtained. This material had a molecular weight of 875 and a specific viscosity of 0.1477.

Example VII

Similarly, from a mixture of approximately 16 parts of acrylonitrile, 108 parts of chloroform, and 0.48 part of benzoyl peroxide, there may be recovered after heating at 95° C., 12 parts of a solid telomer having a specific viscosity of 0.11 determined at 25° C. on a 0.2% solution in dimethylformamide.

Example VIII

Approximately 53 parts of acrylonitrile are charged with 588 parts of dichloromethane and 1.06 parts of tertiary butyl-hydroperoxide to a rocking autoclave and heated at 120° C. for approximately 6 hours. Following the procedure described in Example IV, there is recovered in good yield a low average molecular weight material similar in appearance and physical properties to the telomers in the other examples given above.

Some variations in procedure from those given in the examples may be made without departing from the scope of the invention. The mole ratio of the halomethane to the nitrile may vary over the range from 1:1 to 10:1, for example, depending upon the molecular weight desired in the product. Generally, the molecular weight of the telomer formed decreases with an increase in the ratio of halomethane, or chain transfer agent, to nitrile employed. Since the preferred molecular ratio will depend upon the desired chain length of the product, considerable latitude may be exercised in the choice of reactant quantities. There is, however, a limiting factor with regard to the excess of carbon tetrachloride used. Amounts greater than that represented by the 10:1 ratio, while they may be employed, serve no useful purpose and necessitate recovery of the chlorinated transfer agent for economical reasons.

The telogens with which the invention is concerned are halomethanes such as $CCl_4$, $CHCl_3$, $CH_2Cl_2$, $CH_3F$, $CH_3I$, $CH_2I_2$, $CI_4$, $CBr_4$, $CHBr_3$, $CH_2Br_2$, $CH_3Cl$, and the like.

Catalysts other than the benzoyl peroxide and tertiary butyl hydroperoxide mentioned may also be used. Generally, suitable materials for catalyzing the present process are free-radical-liberating agents, i. e., compounds which will decompose to give free radicals. Such compounds include peroxygen-type catalysts, for example, acyl peroxides such as acetyl, benzoyl, lauroyl or stearoyl peroxides; hydrocarbon peroxides or hydroperoxides such as di-tert.-amyl peroxide, tert.-butyl hydroperoxide, cumene hydroperoxide, p-cymene hydroperoxide; and inorganic per-compounds such as hydrogen peroxide, sodium peroxide, sodium perborate, potassium persulfate, and alkali percarbonates; hydrazine derivatives such as hydrazine hydrochloride and dibenzoyl hydrazine; organometallic compounds such as tetraethyllead and the like. The quantity of catalyst useful for promoting the addition reaction may range from as little as 0.5% to as much as 5% by weight of the nitrile reacted. Usually, optimum yields are obtained with amounts of catalyst representing from 2–3% by weight of the nitrile employed. Quantities of more than 5% serve no useful purpose and may even cause detrimental side reactions, hence should not be used. Ultraviolet light may be employed with the catalyst or as the sole catalytic agent.

Neither reaction time nor reaction temperature is critical. The time during which the nitrile and halomethane are reacted may be widely varied depending upon the reactant quantities, the reaction temperature used, the nature of the individual catalyst employed, etc. Generally, times of from one to twenty-four hours are employed. The process of the invention may be carried out over a wide range of temperatures from 50° C. to 150° C. or above. The preferred temperature depends primarily on the catalyst employed since the minimum temperature of the reaction is that required to decompose the catalyst and generate free radicals. When benzoyl peroxide is the catalyst, for example, the reaction is usually initiated at about 60° C. to about 100° C., while with tertiary butyl hydroperoxide, reaction begins at about 100° C. to about 120° C. Optimum yields are generally obtained by operating at temperatures which permit steady decomposition of the catalyst, with consequent steady liberation of trichloromethyl free radicals.

What is claimed is:

1. Compounds of the formula $$Y-\left[\begin{array}{c}Z\\ |\\ CH_2-C\\ |\\ CN\end{array}\right]_n-CH_mX_{3-m}$$

wherein Y is chosen from the group consisting of hydrogen and the halogens, Z is chosen from the group consisting of hydrogen and the methyl radical, X is a halogen, $n$ is an integer from 2 to 30, and $m$ may vary from 0 to 2.

2. Compounds of the formula

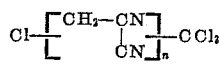

wherein *n* is an integer from 2 to 30.

3. Compounds of the formula

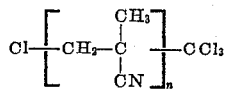

wherein *n* is an integer from 2 to 30.

4. Compounds of the formula

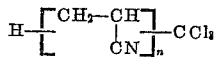

wherein *n* is an integer from 2 to 30.

5. Compounds of the formula

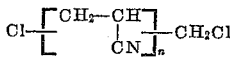

wherein *n* is an integer from 2 to 30.

6. A process for the preparation of nitrile telomers of the general formula

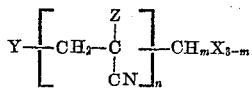

wherein Y is chosen from the group consisting of hydrogen and the halogens, Z is chosen from the group consisting of hydrogen and the methyl radical, X is a halogen, *n* is an integer from 2 to 30, and *m* may vary from 0 to 2, which comprises reacting an aliphatic unsaturated nitrile chosen from the group consisting of acrylonitrile and methacrylonitrile with a halomethane in such amounts that the mole ratio of halomethane to nitrile is within the range from 1:1 to 10:1, in the presence of a free-radical-type catalyst.

7. A process for the preparation of nitrile telomers of the general formula

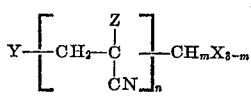

wherein Y is chosen from the group consisting of hydrogen and the halogens, Z is chosen from the group consisting of hydrogen and the methyl radical, X is a halogen, *n* is an integer from 2 to 30, and *m* may vary from 0 to 2, which comprises reacting, at a temperature from about 50° C. to about 150° C., an aliphatic unsaturated nitrile chosen from the group consisting of acrylonitrile and methacrylonitrile with a halomethane in such amounts that the mole ratio of halomethane to nitrile is within the range from 1:1 to 10:1, in the presence of a free-radical-type catalyst.

8. A process for the preparation of nitrile telomers of the general formula

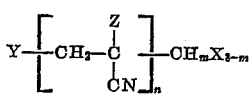

wherein Y is chosen from the group consisting of hydrogen and the halogens, Z is chosen from the group consisting of hydrogen and the methyl radical, X is a halogen, *n* is an integer from 2 to 30, and *m* may vary from 0 to 2, which comprises reacting, at a temperature from about 60° C. to about 100° C., an aliphatic unsaturated nitrile chosen from the group consisting of acrylonitrile and methacrylonitrile with a halomethane in such amounts that the mole ratio of halomethane to nitrile is within the range from 1:1 to 10:1, in the presence of benzoyl peroxide.

9. A process for the preparation of telomers of acrylonitrile of the formula

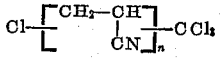

wherein *n* is an integer from 2 to 30 which comprises reacting acrylonitrile with carbon tetrachloride at a temperature within the range from 50° C. to 150° C. in the presence of a free-radical-type catalyst and in amounts such that the mole ratio of carbon tetrachloride to acrylonitrile is within the range from 1:1 to 10:1.

10. The process of claim 9 in which the free-radical-type catalyst is benzoyl peroxide.

11. A process for the preparation of telomers of methacrylonitrile of the formula

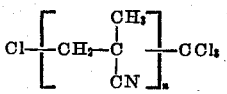

wherein *n* is an integer from 2 to 30 which comprises reacting methacrylonitrile with carbon tetrachloride at a temperature within the range from 50° C. to 150° C. in the presence of a free-radical-type catalyst and in amounts such that the mole ratio of carbon tetrachloride to methacrylonitrile is within the range from 1:1 to 10:1.

12. The process of claim 11 in which the free-radical-type catalyst is benzoyl peroxide.

13. A process for the preparation of telomers of acrylonitrile of the formula

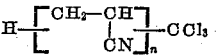

wherein *n* is an integer from 2 to 30 which comprises reacting, at a temperature from about 50° C. to about 150° C., acrylonitrile with chloroform in the presence of a free-radical-type catalyst and in amounts such that the mole ratio of chloroform to acrylonitrile is within the range from 1:1 to 10:1.

14. The process of claim 13 in which the free-radical-type catalyst is benzoyl peroxide.

15. A process for the preparation of telomers of acrylonitrile of the formula

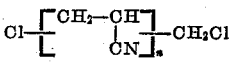

wherein *n* is an integer from 2 to 30 which comprises reacting, at a temperature from about 50° to about 150° C., acrylonitrile with dichloromethane in the presence of tertiary butyl hydroperoxide and in an amount such that the mole ratio of dichloromethane to acrylonitrile lies within the range from 1:1 to 10:1.

References Cited in the file of this patent

UNITED STATES PATENTS

| | | |
|---|---|---|
| 2,440,800 | Hanford et al. | May 4, 1948 |
| 2,568,859 | Ladd et al. | Sept. 25, 1951 |
| 2,725,411 | Ladd et al. | Nov. 29, 1955 |